United States Patent [19]
Casimaty

[11] Patent Number: 5,673,513
[45] Date of Patent: Oct. 7, 1997

[54] TURF PRODUCT

[75] Inventor: Gabriel Casimaty, Richmond, Australia

[73] Assignee: StrathAyr Pty. Limited, Richmond, Australia

[21] Appl. No.: 433,362

[22] PCT Filed: Nov. 1, 1993

[86] PCT No.: PCT/AU93/00565

§ 371 Date: Jun. 8, 1995

§ 102(e) Date: Jun. 8, 1995

[87] PCT Pub. No.: WO94/09613

PCT Pub. Date: May 11, 1994

[30] Foreign Application Priority Data

Nov. 2, 1992 [AU] Australia ............... PL5630

[51] Int. Cl.⁶ ............................................. A01G 9/02
[52] U.S. Cl. ............... 47/66; 47/56; 108/51.1; 108/56.3; 171/19
[58] Field of Search ................... 108/51.1, 56.3; 171/19, 20; 47/73 F, 76 R, 66.5, 1.01, 1 F, 56

[56] References Cited

U.S. PATENT DOCUMENTS

| 4,735,153 | 4/1988 | Wong | 108/51.1 |
| 4,982,859 | 1/1991 | Colebrook | 108/51.1 |
| 5,224,290 | 7/1993 | Molnar | 47/56 |
| 5,309,846 | 5/1994 | Peterson | 108/51.1 |
| 5,326,192 | 7/1994 | Freed | 47/1 F |

FOREIGN PATENT DOCUMENTS

| 2645230 | 4/1978 | Germany | 47/665 |
| 4012773 | 10/1991 | Germany | 47/665 |
| 6-156496 | 6/1994 | Japan | 108/51.1 |
| 1213926 | 11/1970 | United Kingdom | 47/665 |
| 1360594 | 7/1974 | United Kingdom | 108/51 R |
| 5690 | 4/1992 | WIPO | 47/665 |

OTHER PUBLICATIONS

Netlon Advanced Turf (Jan. 1992) 6 pages.

Primary Examiner—Terry Lee Melius
Assistant Examiner—Joanne C. Downs
Attorney, Agent, or Firm—Edwin D. Schindler

[57] ABSTRACT

A turf product having a base (11), a root zone material and a reinforcement material (15) located thereon and turf growing in the root zone material (13), the base preferably being the upper surface of a pallet (10). The invention also includes a method and means whereby the turf can be located temporarily in position whilst on pallets and one in which the turf can be placed on the ground surface by locating the turf on a pallet in the required position and then removing the pallet from thereunder.

9 Claims, 10 Drawing Sheets

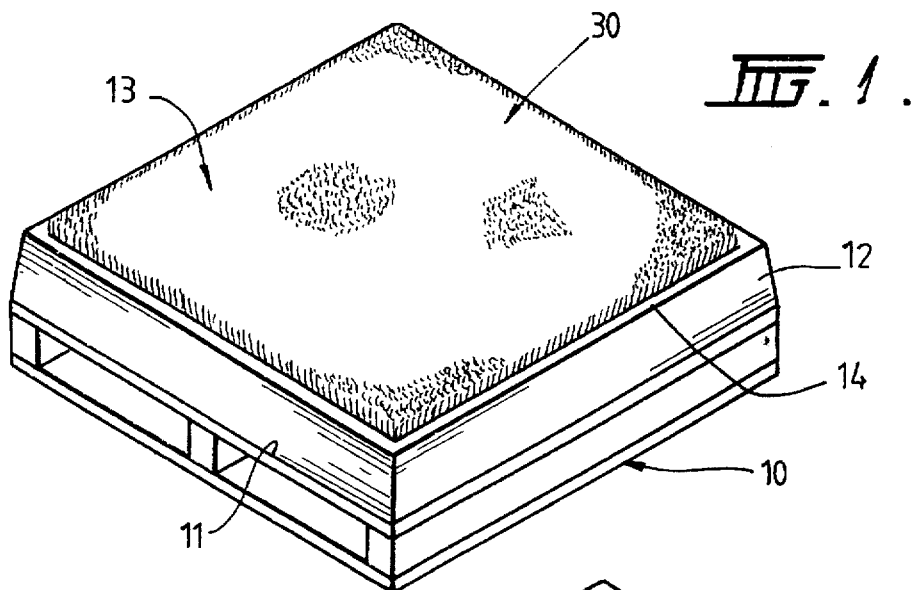
FIG. 1.
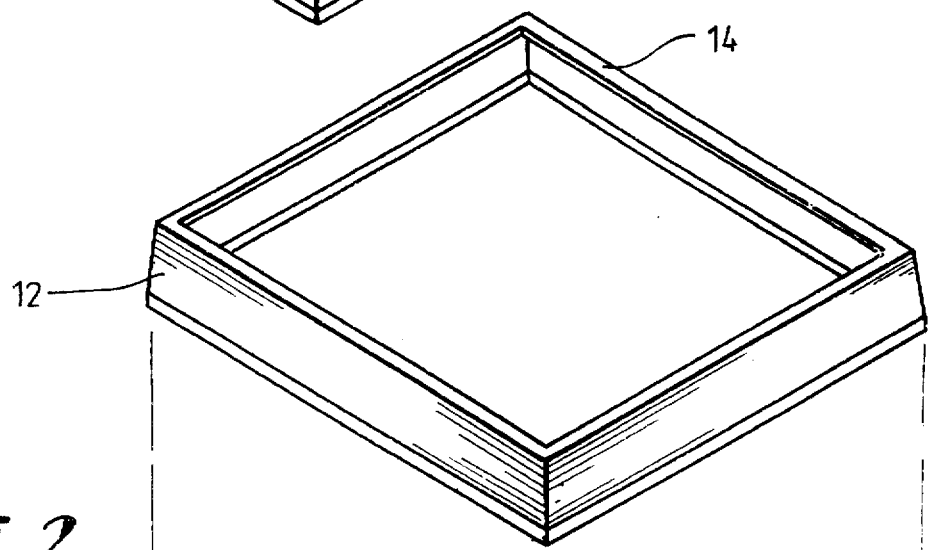
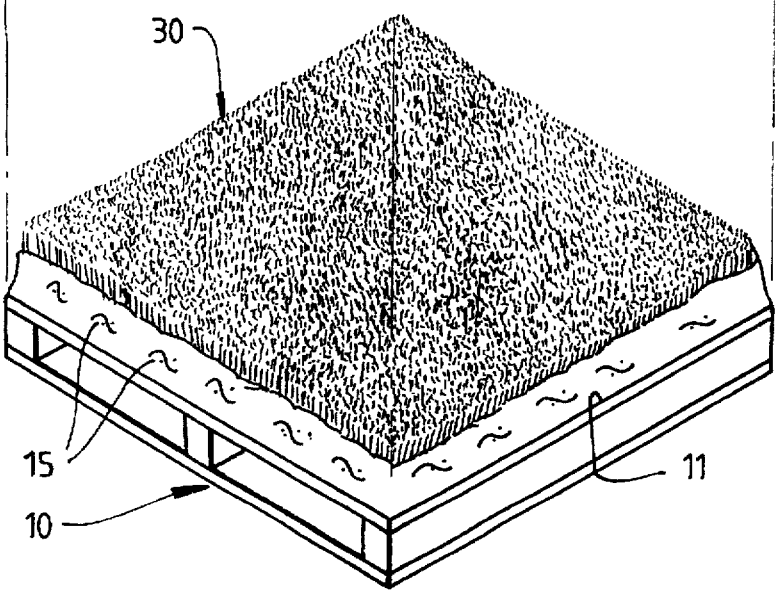
FIG. 2.

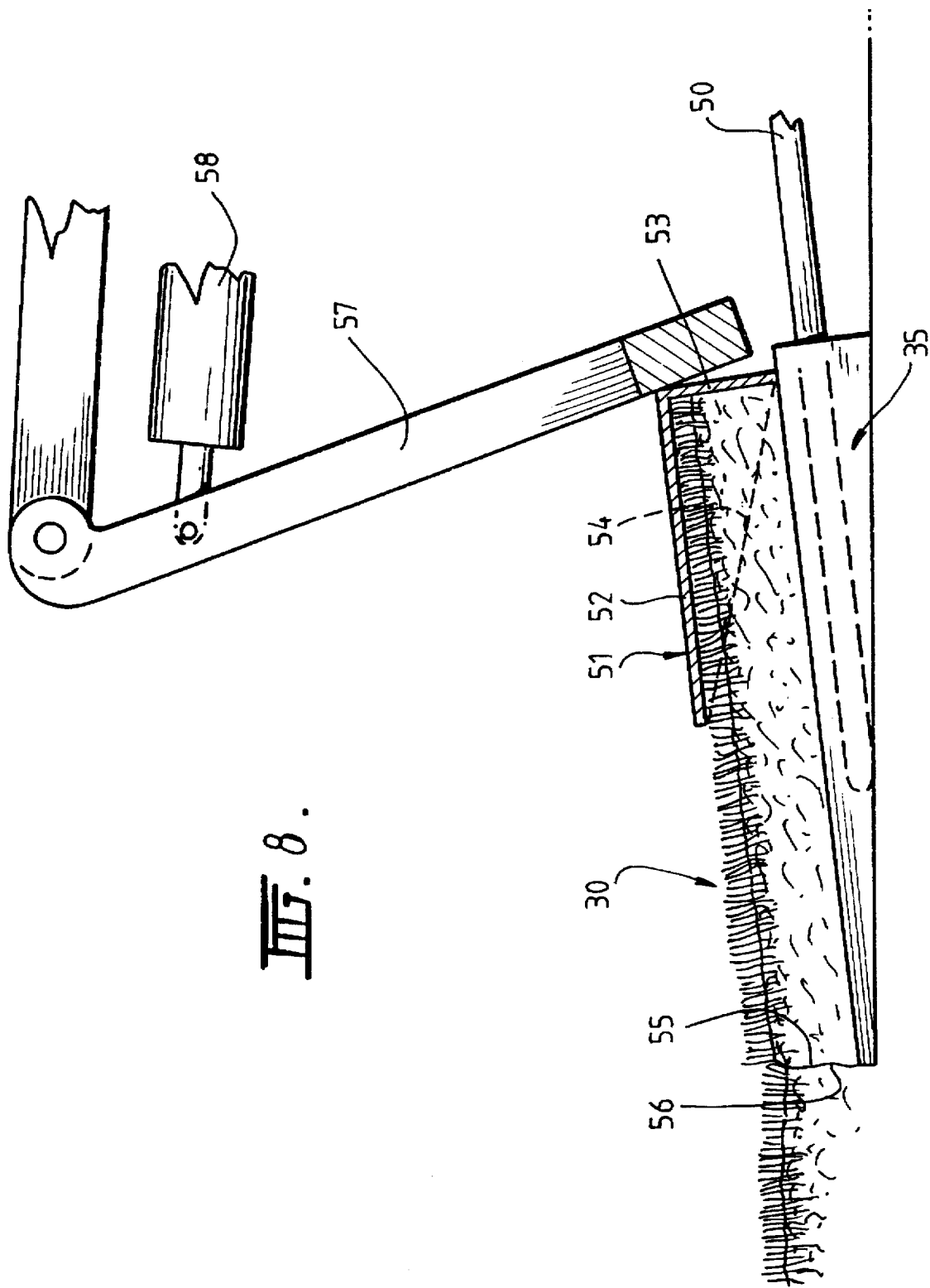

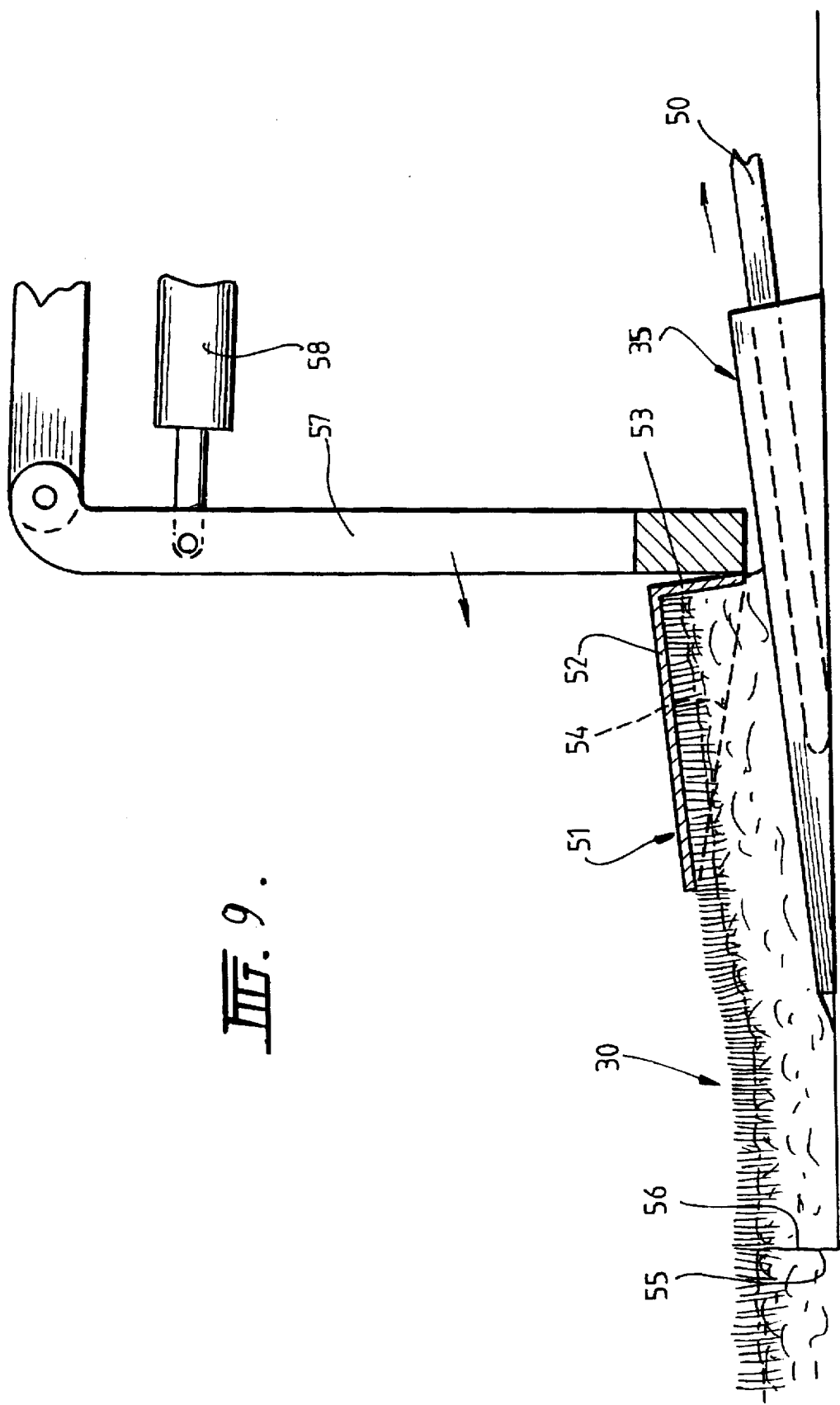

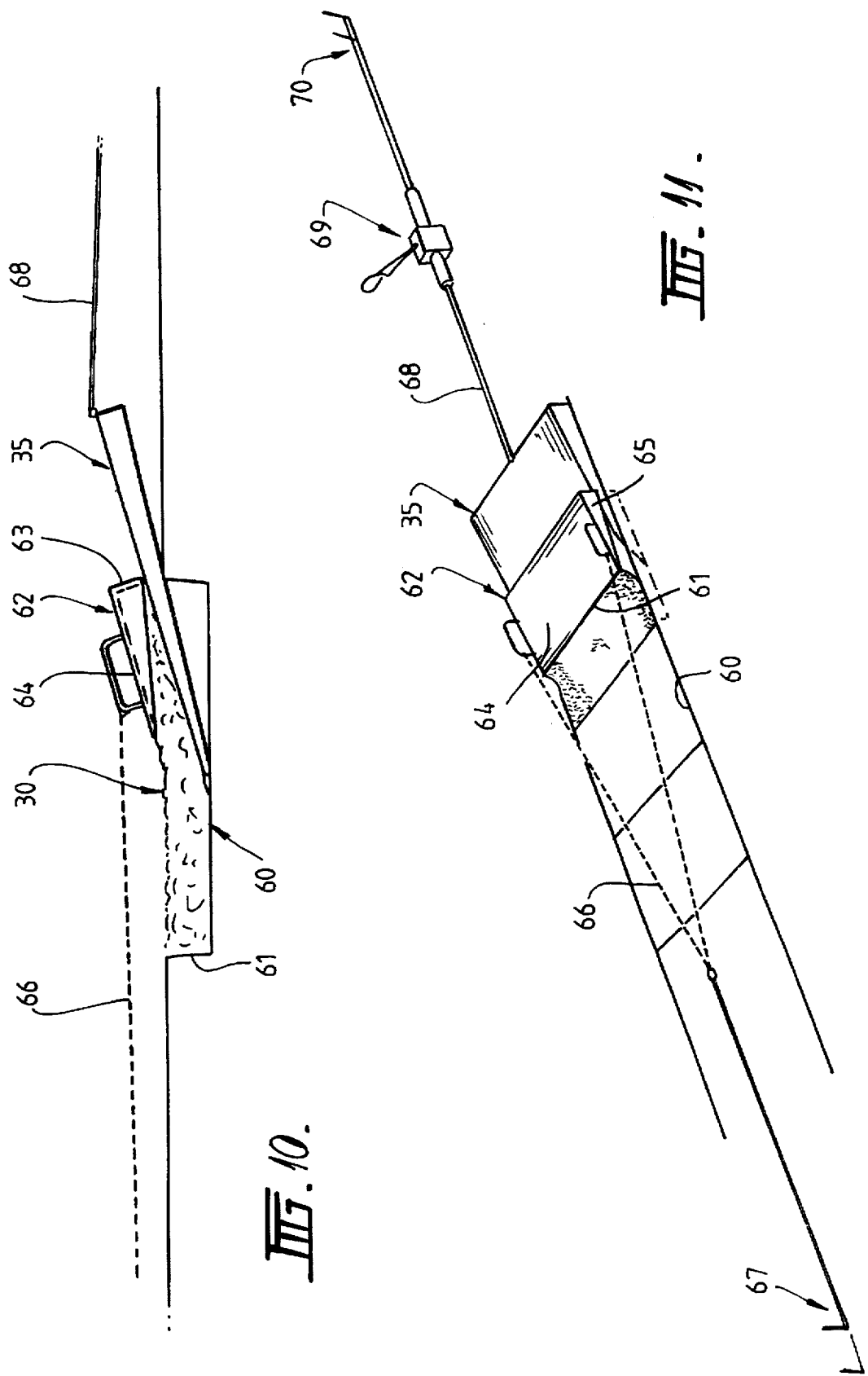

TURF PRODUCT

This invention relates to a turf product and particularly to a turf product which has two distinct uses.

In this specification, we shall use the term turf both in the sense of the whole of the product to be described, and the planted material which is actually growing. The two usages will be readily separable by the context.

There are certain applications were it is desirable that turf be located temporarily in an area and, whilst this has previously been done, it has usually been a time consuming and expensive operation. Conventional turf used for this purpose does not withstand foot traffic etc. without severe deterioration.

There are also applications where it would be desirable to be able to lay turf rapidly for permanent installations in such a way that it is already established. Such applications, it is believed, would primarily be in high wear areas which could include, for example, football centres and goal squares, golf tees, and other similar applications but could also include applications where, for example, a whole sporting field or golf course needs to be ruffed rapidly.

It is the object of the present invention to provide a turf product which is useful in both such applications.

The invention in its broadest sense comprises a turf product having a transportable base, a root zone material having embedded reinforcement material therein located thereon and turf growing in the root zone material.

It is preferred that there is an upwardly directed skirt about the base with the root zone and reinforcing material being located in the volume defined by the base and the skirt.

The root zone material could be sand or it could be soil or a combination of these.

The reinforcement may be a plastics element or it could be a fibrous material and is preferably randomly located through the root zone material. Plastics elements are sold under the trade mark Netlon. These elements are cut from a plastics net and generally have at least one closed portion with extensions directed outwardly therefrom. There can be other forms of elements which are equally satisfactory.

Preferably the base is the upper surface of a pallet which can be handled by a fork lift or the like and also preferably the skirt may be removable from the base so that the turf is left with an edge which is effectively co-terminus with the base.

Particularly in some applications where great rigidity of the base is required, it is preferred to use a plastic pallet although the base could be of other material. It is preferred that it is basically a solid surface, and as such could satisfactorily of marine ply or steel or the like.

In a first application of use of the product of the invention, the product can be shifted to an area where a temporary turf is required, the pallet can be removed from the transport vehicle, the skirt can be removed from the pallet and adjacent pallets can be butted to provide a continuous turf surface.

In an application where the turf is to be permanent, the pallet can be moved to the required position, the skirt can be removed therefrom, one side of the pallet can be located where it is required that the turf be fitted and the turf can be held in a fixed position relative to the ground whilst the pallet is moved away from beneath the turf until the turf is located on the ground surface. In the use of this process, the turf growing on various pallets can be butted so that a continuous turf cover is provided which is already established and which can be used effectively immediately.

In order that the invention may be more readily understood, we shall describe with the aid of the accompanying drawings, certain embodiments of the invention.

In these drawings:

FIG. 1 shows a standard pallet of turf material as it would be delivered;

FIG. 2 shows the pallet of FIG. 1 with the skirt removed;

FIG. 8 shows turf on a pallet as shown in FIG. 3 located on a fork lift and positioned for location;

FIG. 9 is similar to FIG. 8 and shows the pallet being removed from under the turf;

FIG. 10 is a side elevation showing turf being located using ground anchors rather than a fork lift;

FIG. 11 is a perspective view of the arrangement of FIG. 10;

Figure 3:
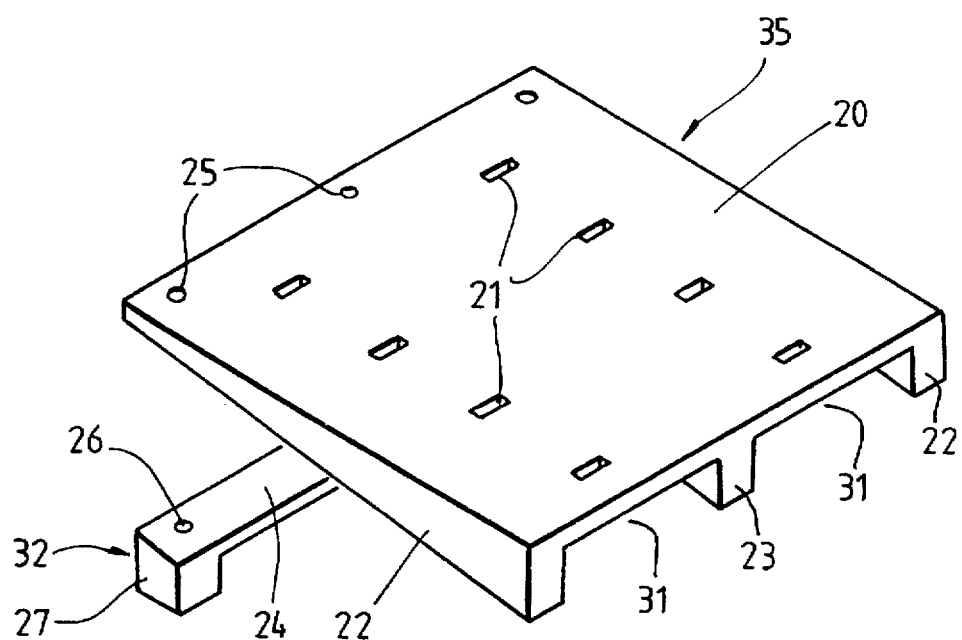
FIG. 3 shows a pallet particularly suitable to the invention which has a removable foot piece which enables the base of the pallet to be horizontal in normal use but permits the pallet to be wedge shaped when the material is to be delivered therefrom.

Generally, where the turf is stated to be grown on a pallet, this can be considered to be grown on the upper surface of a standard size pallet, which is 46 inches square, but it is to be appreciated that the base on which the turf is grown can be of any other form. Pallets are, however, most satisfactory as they are designed for ready movement by a fork lift. In relation to FIGS. 3 and 4, we describe a particular form of pallet which is suitable for use with the invention.

Referring first to FIGS. 1 and 2, in these we show a conventional form of pallet 10, the top surface 11 of which may be smooth or may have apertures for water and/or air flow. Located around the pallet and extending upwardly therefrom a skirt 12, the inner edges of the bottom of which can abut the outer edges of the pallet 10 to form an open topped volume 13 therewith.

This skirt 12, as illustrated may be of sheet metal, preferably stainless steel and may have inturned edges 14 for rigidity but the material of construction is not relevant to the invention. However, it could satisfactorily be of a plastics material. The skirt 12 is removably attached to the pallet 10.

In the volume 13, we place a mixture of a root zone material and a reinforcing material 15. The root zone material is a particulate material and may preferably be sand but it could also be soil or a mixture of these. In this specification, the use of the word sand is deemed to comprehend each of these.

The reinforcing material 15 could be of plastic elements which are randomly oriented and evenly spread through the root zone material. As mentioned above, one form of such elements which are satisfactory are sold under the registered trade mark Netlon. Alternatively, the reinforcing material could be fibrous material or some other material which can bind the root zone material.

The surface is then seeded or could have sprigs of turf located therein.

Alternatively we could locate already established turf within the volume on the pallet.

The turf is maintained so that it becomes fully established within the root zone material and covers the whole of the surface thereof.

Figure 4:
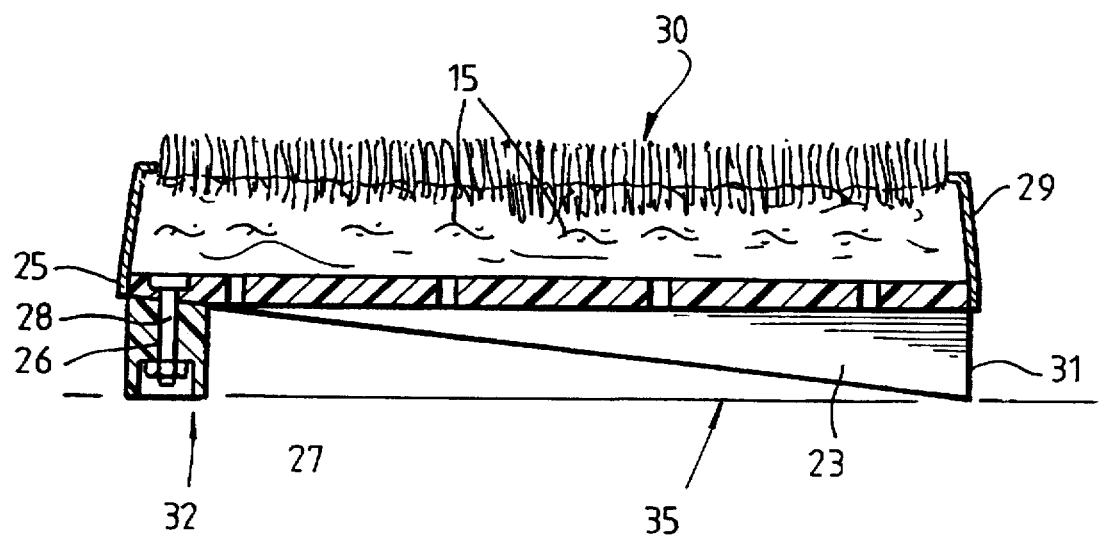
FIG. 4 shows a cross section of the pallet of FIG. 3 with turf growing thereon.

Referring to FIGS. 3 and 4, we show a plastic pallet 35 which is particularly suitable for use with certain aspects of the invention. The pallet has a base 20 which may have holes 21 therethrough to permit the passage of water therefrom.

It has two side fillets 22 and a central fillet 23 so that at one end has fork receiving recesses 31 but at the other the fillets 22 and 23 taper effectively to the thickness of the base.

We do provide a foot member 32 which has a top member 24 which is adapted to underlie the top 20 and which has three feet 27, of which only one is shown. There are apertures 26 through the feet and top members which are adapted to be complementary to apertures 25 formed in the top 20 of the pallet and the foot member 32 and the pallet can be interconnected by bolts 28.

As illustrated in FIG. 4, when the foot member 32 is connected to the pallet 35, the top 20 of the pallet will be effectively horizontal, when the pallet is on a flat surface. Also, a skirt 29 can be connected thereto and turf 30 grown therein in a manner as previously described.

When the turf product is to be used it is shipped on its pallet to the required place of use and is used in one of two basic ways.

Figure 5:
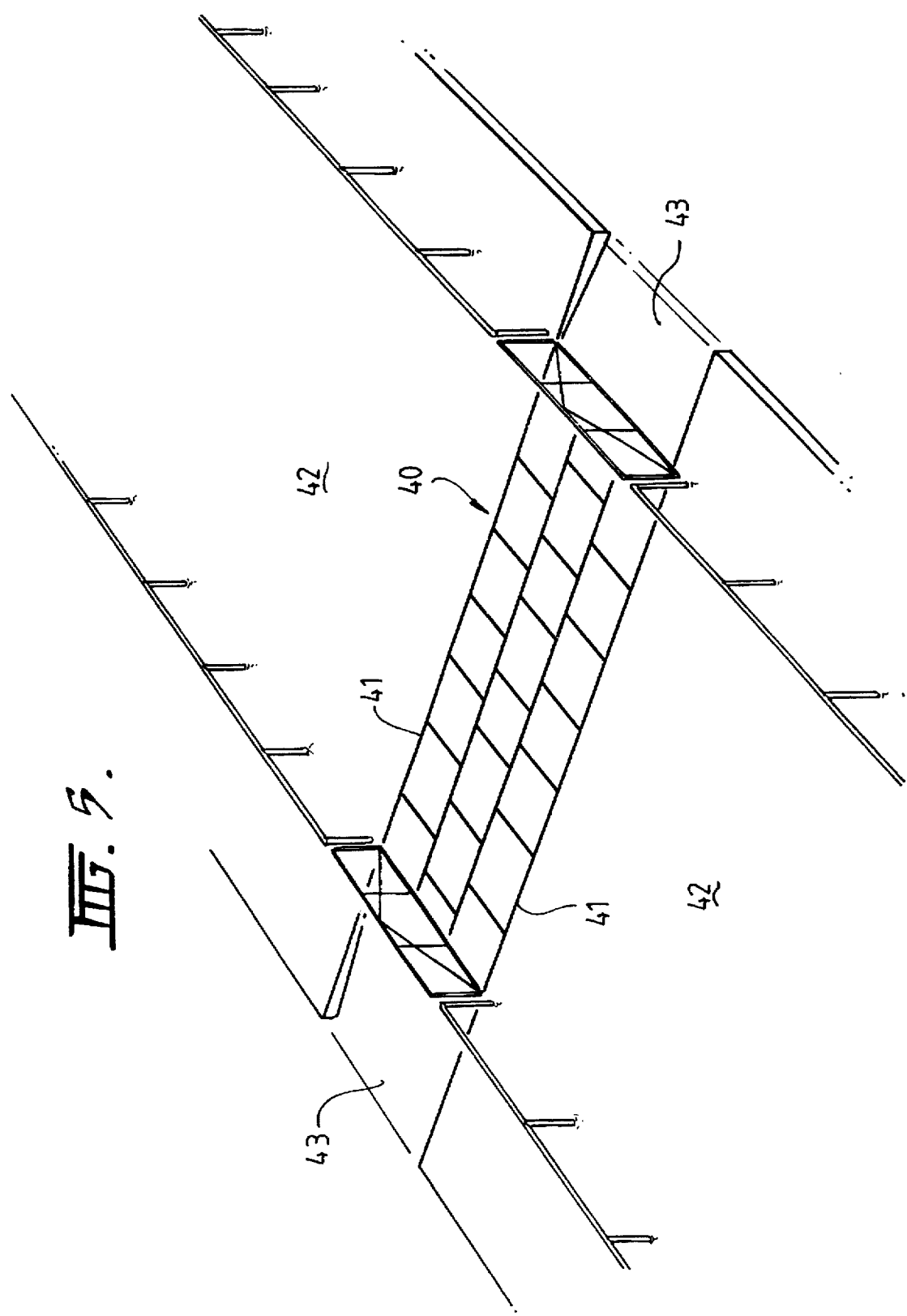
FIG. 5 shows, schematically a crossing over a race track.
Figure 6:
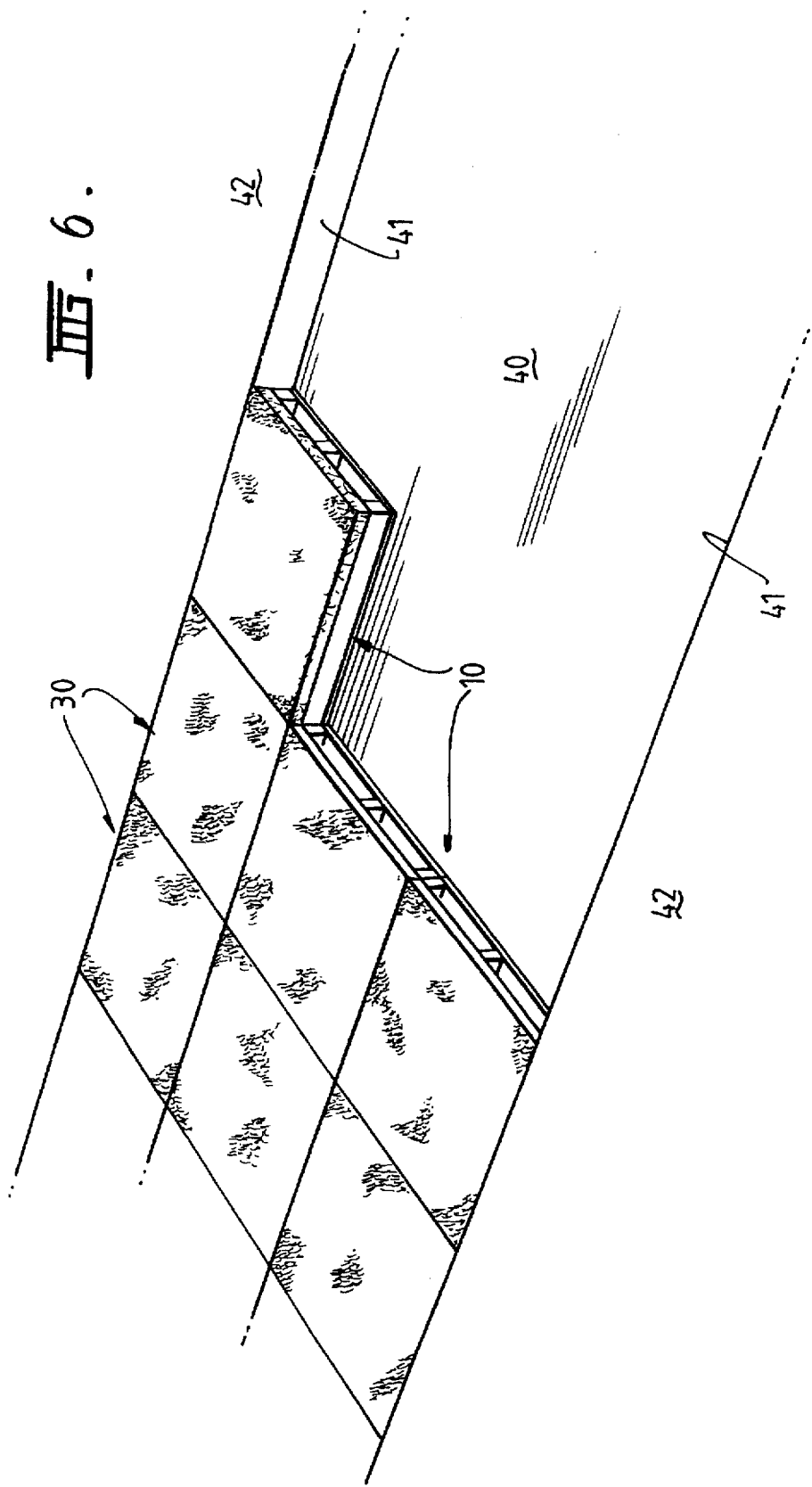
FIG. 6 shows the laying of the crossing with turf located/ on pallets.

The first way, which is exemplified in FIGS. 5 and 6 is where a temporary turf surface is required. This application is particularly useful for grassed horse race tracks or raceways. Horse tracks are usually of substantial size and it is necessary to do maintenance work and otherwise gain access to the interior of the track. It will be appreciated that if vehicles are continuously driven across the track, the area used by the vehicles will, at best, be different to the remainder of the track and can be substantially damaged. This can particularly be the case if the track is wet.

By the use of the invention, we can provide specific crossings over the track which can normally be below the level of the track by about the thickness of the product of the invention.

When the track is not being used for horses, these crossings can be available and vehicles can cross the track on the crossings.

A crossing 40 is indicated in FIG. 6. It may be desirable to incorporate an edging which can be located against the edges 41 of the track, to provide support to the edge of the turf 42 of the track when the crossings 40 are being used.

When the track is to be used by horses, pallets 10 are located as discussed earlier herein by removing the skirts 11 and butting the pallets.

It will be understood that the pallets used in this application have to be rigid so that the horses, when they pass onto the crossing do not get any feeling of insecurity. It will also be appreciated that the turf product of the invention provides a surface which can be as firm as that of the remainder of the track and thus, provided there is no movement in the pallets, there will be sufficient rigidity.

The crossing will be of such a width as to be equal to a predetermined number of pallets so along the length of the track there will be no tendancy for the pallets 10 to move.

Whilst, as illustrated, we show the pallets as being in a side-by-side relationship, it may be preferred that they be offset transversely by the width of half a pallet, so a brick-like arrangement is achieved. If such an arrangement is used, any alternate row will, at each side of the track, be half a pallet out of line with the adjacent rows and in order to overcome any difficulty arising from that, we can provide pallets which are of the same length as the other pallets but half the width, with length and width being used as an explanatory term. These half pallets can be placed at each end of the alternate rows so all the rows terminate at the same position.

It may be desirable to provide stop means along the sides of the track to prevent undue movement of the pallets sideways relative to the track but the weight of the pallets and their contents would normally be sufficient to prevent such movement. As there may still be necessity to cross the track, the stop means preferably constitute ramps 43 which slope up to the surface to enable necessary vehicles to cross the track.

It may be necessary, before locating the pallets, to level the surface upon which the turf is to be located normally by adding sand thereto. This is specifically applicable if, for example, the product is to be used over a road or a walkway.

In the actual location, the first pallet 10 has its skirt 11 removed so that extending upwardly from each side of the pallet there is consolidated root zone material, reinforcement and root mass and this pallet is located in the required position.

Subsequent pallets are butted up to the first pallet to cover the area and it will be appreciated that the turf of each of these adjacent pallets abuts so that when the pallets are all laid, the body of the turf is in fact in abutting relationship and on downward pressure such as by rolling or weight thereon.

In the crossing application, illustrated in FIGS. 5 and 6, the edges 41 provide an abutment surface and it may be desirable before locating the pallets to remove any edging material thereon.

It may be desirable to locate the pallets along the rails of the racetrack on support members, which could be rectangular steel girders which could be the same height as the spacing of the underside of the base from the ground that the pallet had additional rigidity where it most likely to bear the maximum load.

In some applications, rather then removing the turf when the track is not being used, we may prefer to supply two or three sets of pallets for each crossing and to leave pallets in position at al times. Under this arrangement, the crossing would be used until the turf becomes worn at which time the pallets would be lifted and replaced with fresh pallets and the original pallets would be placed in a position where they can be left to recuperate. Depending on the usage, and the frequency of replacement, we may prefer that three sets be rotated rather than two.

In applications where temporary turf is required, we could roll or otherwise work the turf so that it adopts closely abutting orientations but in some applications, pressure provided by use, such as people walking on the turf, will tend to ensure the surfaces abut closely and the surface will be effectively continuous.

It will be appreciated that because of the reinforcement material 15, the turf on each pallet has good dimensional rigidity.

Where the turf is being located on a surface, it may be preferred to locate, around the periphery of the turf, a formwork or the like to support the outwardly directed edges.

Alternatively we could grow a particular form of turf having a tapered outer surface, for example, of a triangular form which butts the external edge of the turf being laid to provide a ready transition between the adjacent surface and the turf.

When it is required to remove the turf, it is only necessary to move each individual pallet 10 outwardly and, if required, relocate a skirt 11 thereabouts so that the turf is supported and this can then be shipped back to its source or otherwise used.

Figure 14:
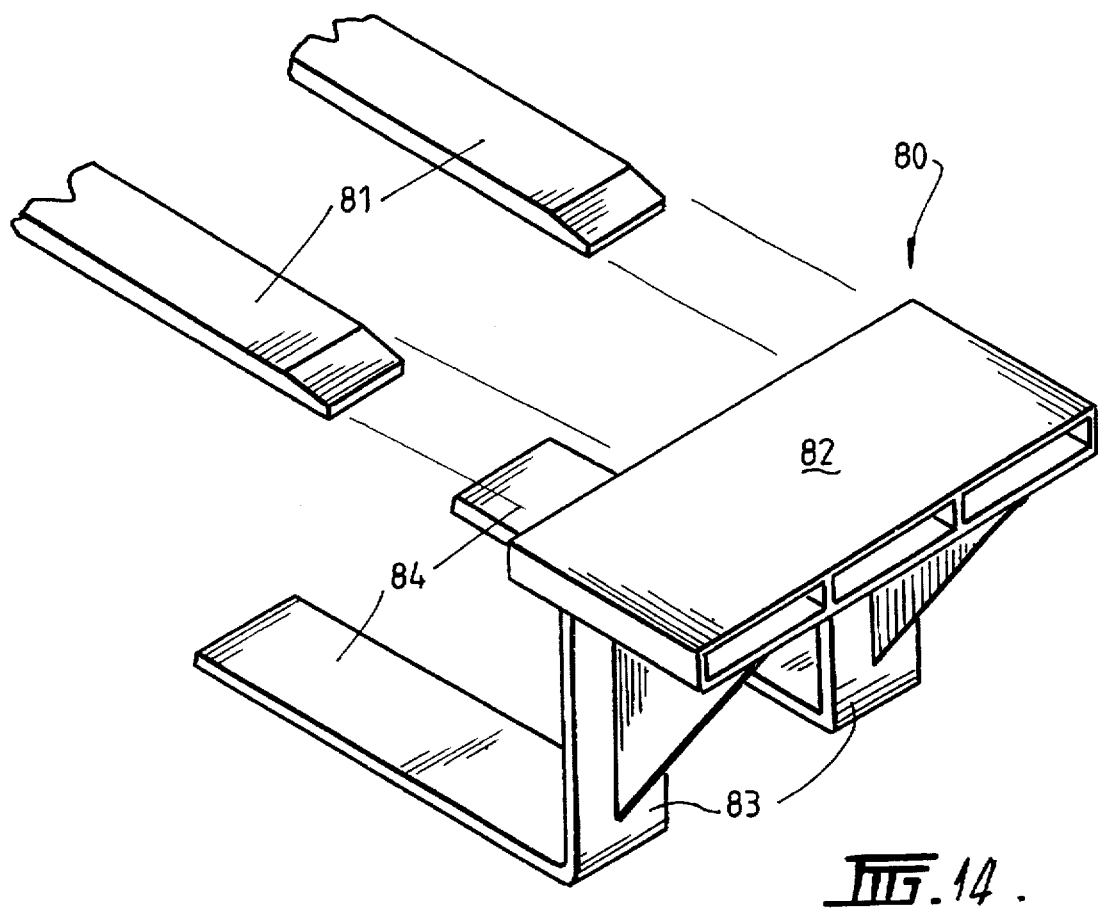
FIG. 14 is a view of an attachment to a fork lift to enable it to be operated in a reverse direction.
Figure 15:
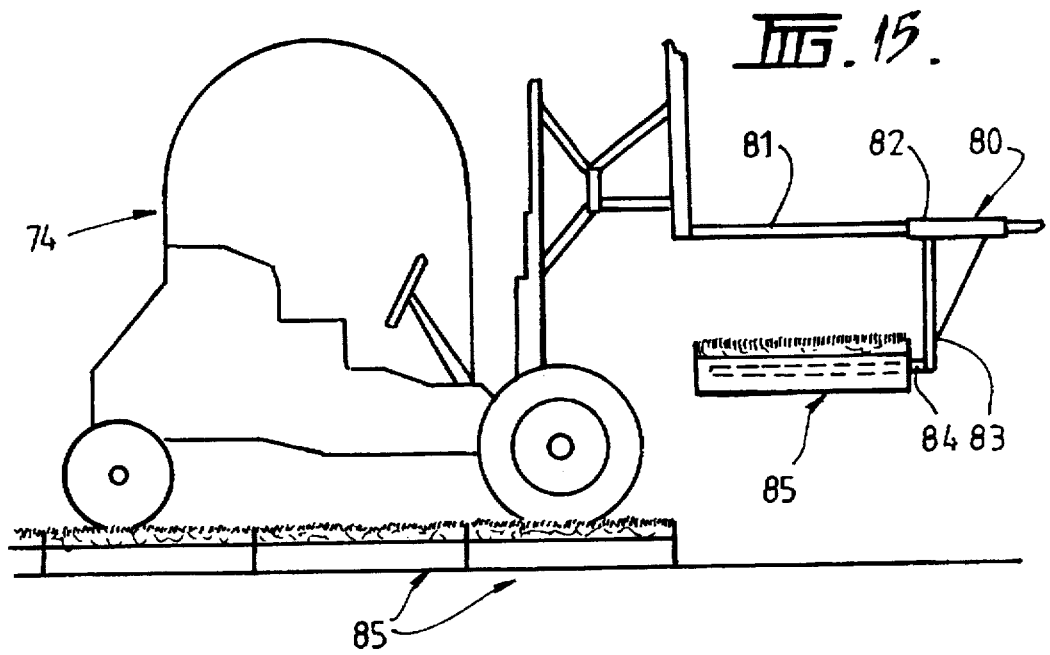
FIG. 15 is a view of the attachment shown lifting a pallet containing turf from the ground surface.

In FIGS. 14 and 15 we will describe a particular attachment for a fork lift to facilitate this movement.

Because of the inclusion of the reinforcing material 15, the product of the invention can withstand heavy wear without damage and even the passage of vehicles is not detrimental to the product.

A different application of the invention can be used to provide ready multi-use of a ground. As an exemplification, we will describe a particular ground to be used both as a football field or stadium and as a baseball ground.

When playing baseball, the diamond, the pitcher's mound and the hitter's and the catcher's positions are made of a material such as dolerite which is generally a reddish clay. It is possible to make these areas of the field of other clay or gravel based materials and, in this specification the use of the term dolerite will be deemed to include any other suitable material.

The invention can be applied, during the football season, by using the product of the invention to fill the areas which during the baseball season would be of dolerite. When, on the other hand, the ground is required for baseball, the pallets containing the material which lie on any of the areas which are to be of dolerite are removed and we provide pallets which are filled with dolerite which are located in the area. Additional dolerite is added to make up the required height and this is then watered and rolled to provide the required surface. In this application, either the skirts are left in position or are removed after the pallets are positioned.

When the ground is again required for football or other sport, the upper layer of dolerite is removed, the pallets are removed, the base is prepared, normally be adding sand and pallets with the turf of the invention are located thereon. The ground is ready for play effectively immediately.

This embodiment differs from the previous embodiment in that, although it expedites the change of use, and the ground can be used for either use effectively immediately, the time to effect this conversion would be substantially more than that for the previous embodiment. However, on the basis of being done, say twice per year, it readily enables the multiple use.

Figure 7:
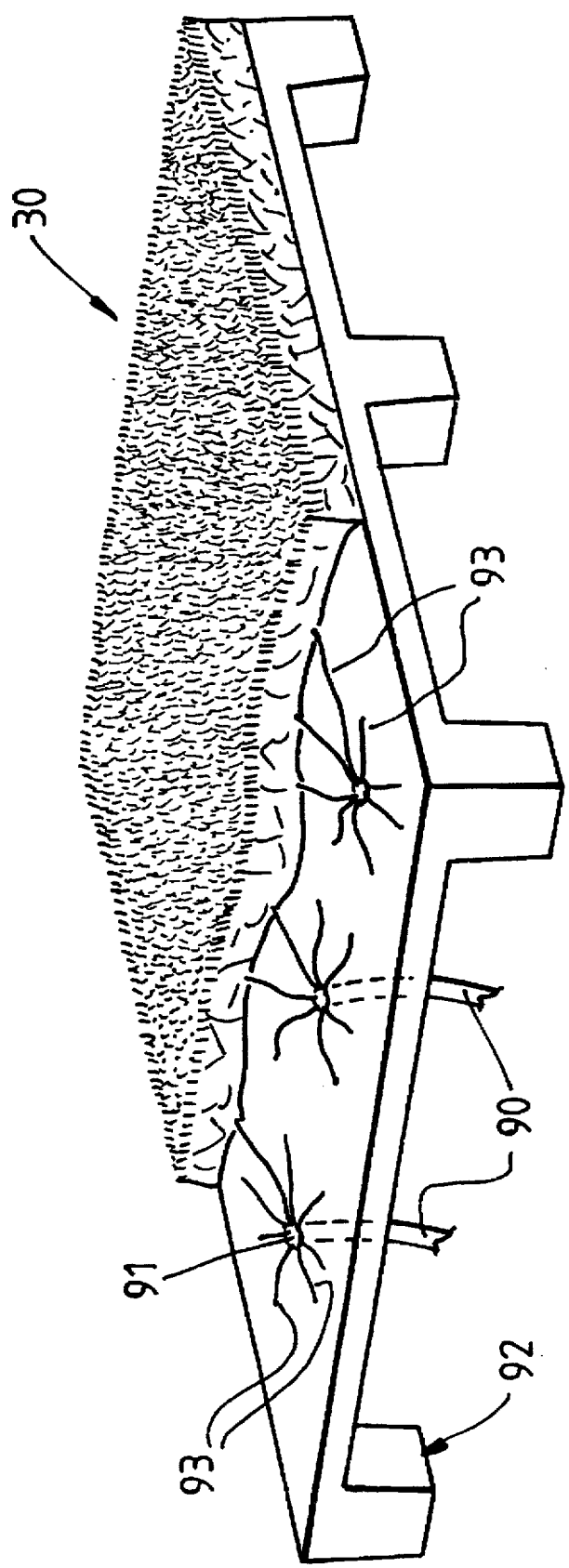
FIG. 7 shows a broken view of a pallet having wicks located therein.

It may be preferred, when using pallets which are able to be moved, to use a pallet as illustrated in FIG. 7. It will be appreciated that the depth of the sand is less than normally located turf. In the embodiment of FIGS. 5 and 6, this is approximately half that of the adjacent turf.

This means that the hydraulic conductivity of the sand on the pallet is less than that of the adjacent turf. The effect of this is that on the incidence of rain or watering, the sand on the pallet will hold moisture more than the adjacent material and this can be detrimental to the concept which is to have a track the properties of which are consistent.

This can be overcome by using larger sized sand particles, which have a greater hydraulic conductivity, on the pallets than on the remainder of the track.

The embodiment of FIG. 7 overcomes or minimises the difficulty by providing wicks 90 which pass through apertures 91 in the pallet 92. The wicks can be of a diameter and length which provide an overall hydraulic conductivity the same as the adjacent turf. The condition of the turf which is on pallets is then effectively the same as the adjacent turf.

As the movement of water horizontally through sand is relatively slow, we may prefer to use wicks which are ropes which can be unravelled and the upper ends 93 thereof can be spread about the upper surface of the pallet and can, if required be located into the soil profile to ensure that the moisture is correctly moved therethrough.

The number of wicks used can vary depending on the circumstances but in one application we can use 1 wick for each 100 cm$^3$ of pallet surface and a satisfactory wick may be 10 mm in diameter.

In the second basic way of applying the invention, the turf is to be used in a semi-permanent or permanent location. In this case, there would normally be a sand root zone or the like which is laid.

A first embodiment is shown in FIGS. 8 and 9. In this embodiment, the turf 30 is on a pallet 35, as illustrated in FIGS. 3 and 4 and the pallet 30 is on forks 50 of a fork lift. A boot 51, which has a top 52 which overlays the turf, a rear member 53 which is located over the rear of the turf and two side members 54 which are located on the opposite sides of the turf.

The forward edge 55 of the turf is abutted against the edge 56 of the trench or the like into which the turf is to be located. A pusher 57, which may be of any required form and which is associated with the fork lift and which can be driven by an hydraulic ram 58 is caused to move forward putting pressure on the boot 51 and thus the turf. As this pressure is applied, the fork lift is moved backwards, either by transmission of the rearward force on pusher, or under power, and the pallet 35 is withdrawn from beneath the turf. An intermediate position is shown in FIG. 9. When the pallet is removed, the turf drops into the required position. It will be seen that the pallet 35 is particularly suitable for this application as the tapered shape facilitates its removal.

Also, the use of the boot prevents buckling of the turf as the pressure is applied thereto and if necessary weight, such as persons, can stand on the boot.

Further slabs of turf can be similarly located, either in abutment with each other or in further abutment of the edge of the fixed turf. The operation is continued until all of the turf in the required area has been laid.

Whilst this aspect of the invention is satisfactory in turfing areas which are needed to be able to be used almost immediately, it also has great application when only small areas need replacement. For example, a football field may have areas of particular wear, near goal posts and possible in the centre. By the use of this aspect of the invention, the worn area can be removed and new, mature, turf can be located thereon and the ground is immediately ready for play.

This is of great importance where an organisation is attempting to obtain maximum utilisation of the ground.

A second method of locating turf in this general way is illustrated in FIGS. 10 and 11. In these figures, the pallet 35 including the turf and its associated root zone material and reinforcement is located close to the desired position. The pallet 35 is again shown as the pallet of FIGS. 3 and 4 which is most satisfactory, but other pallets could be used.

If the product is to be located in a trench 60 in which it is a close fit, the pallet would be located closely adjacent one edge of the trench with the forward edge of the turf abutting the wall 61 of the trench.

A boot 62, which may be made of sheet material and has a downwardly directed surface 63 which is adapted to fit behind the turf product, a top surface 64 which lies on the surface thereof and two side fillets or the like 65, is located on the turf product. A chain 66 is connected to the boot and, in turn is connected to a ground anchor 67. The pallet 35, is also connected to a chain 68 which, as illustrated in FIG. 11 is connected to a hand winch 57 and a second anchor 70.

The winch 57 is then operated, the turf is prevented from moving because of the boot and the associated ground anchor and the pallet 60 is withdrawn from therebeneath. Again, the boot can resist any force which is attempting to cause the turf from buckling.

After the pallet is withdrawn the turf is either correctly located in the trench 61 or needs only little movement.

Instead of using the ground anchor 69 and the winch 70, the pallet 35 could be connected to a tractor or the like which could move away from the turf, moving the pallet from therebeneath.

Figure 12:
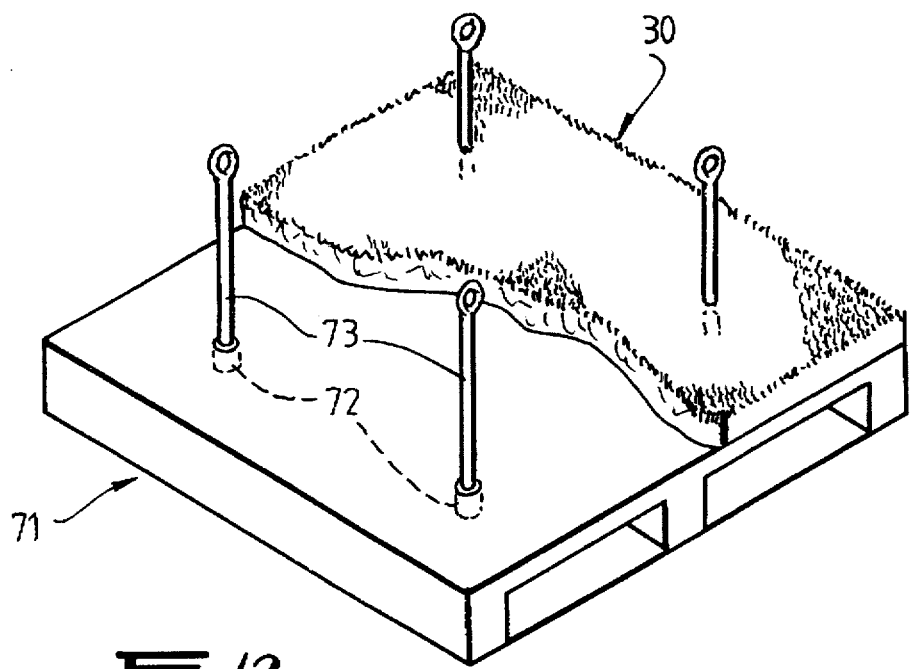
FIG. 12 is a view of a pallet which can have lifting rods located therein.
Figure 13:
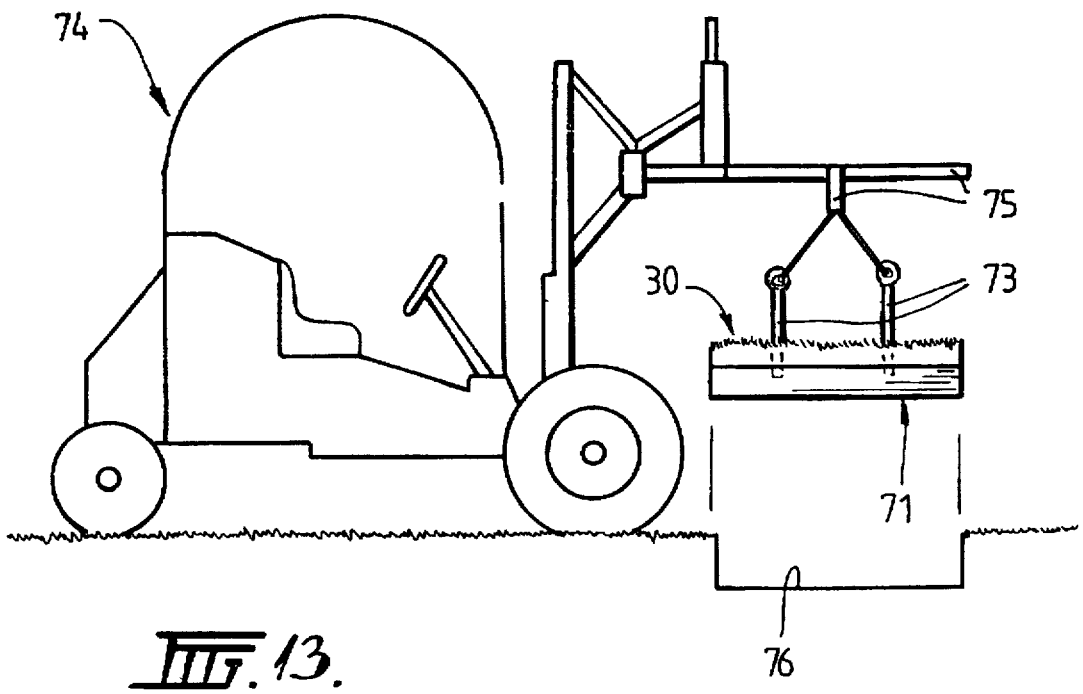
FIG. 13 is a view showing the pallet about to be located in the ground surface.

Referring to FIGS. 12 and 13 we provide a pallet 71 which has threaded inserts therein 72 which are adapted to receive lifting rods 73 which have an eye at one end and can be threaded to cooperate with the threaded inserts 72.

These rods can be located in the pallet either before the root zone material is placed thereon, or can the material can be cut out later to permit the rods to be fitted.

When it is required to locate the pallet 72 and the turf in position, this application being useful where turf is to be temporarily located, it is only necessary to lift the pallet by a forklift or the like 74 which has a sling 75 thereon, locate the pallet above the trench or other position in which it is to be fitted 76 and lower the pallet therein.

The rods can then readily be removed simply by being unthreaded from the threaded inserts 72 leaving the material temporarily in position.

When the pallet is to be removed, then the threaded inserts 72 can be exposed, as by cutting away the turf. The rods screwed thereinto and the pallet can be lifted away from the position.

Alternative arrangements could be used. For example, we could forms eyes in the upper surface of the pallet which could cooperate with rods with eyes. To connect the rods, when the turf is mature, it would be necessary to remove root zone material to locate the eye and then connect the hook thereto.

This particular arrangement is particularly suitable for inserting the last pallets where there is an abutment against which the pallet is to be located. For example, in the embodiment of FIGS. 4 and 5, the last row have to abutted against the edge of the track, and it is not possible to get a fork lift into the position necessary to locate the pallet.

Referring to FIGS. 14 and 15, we provide an attachment 80 which is adapted to be connected to the forks 81 of a fork lift to effectively permit the fork lift to be used in what is effectively an opposite sense to the normal.

The device has a sleeve 82 which is adapted to be connected over the forks 81 and may be provided with means whereby it is locked thereto.

It has a pair of downwardly directed members 83 each of which has a rearwardly directed fork 84, the forks 84 being of substantially the same size as the forks of the fork lift itself and of the same orientation.

The arrangement is such that a fork lift 74 can place pallets in position, or remove pallets by working from the direction of the already located pallets rather than from the opposite direction, that it over the base which has been prepared for the location of the pallets. Particularly where the pallets are being located, this permits the fork lift to work over the already completed area and it does not have to move over the prepared levelled surface on which the later pallets have to be located.

As can be seen from FIG. 14, if the pallet on the forks 84 of the device 80 is to be located, it is only necessary for the fork lift driver to lower the lift mechanism whilst ensuring that the pallet comes into abutment with the already located pallet on which the fork lift is positioned. Alternatively, if pallets are to be removed, the fork lift can be driven over the previous pallets, or the adjacent ground surface an connect with, and lift, the pallet to be removed.

I claim:

1. A pallet for use with a turf product, said turf product having a transportable base, a root zone material having embedded reinforcement material therein and located on the transportable base and turf growing in the root zone material, the pallet comprising a base which tapers from one end to the other and having a foot member which can be removably connected to the base of the pallet adjacent a narrow end so that, for growing or maintenance of the turf, the foot member is connected to the base of the pallet and an upper surface of the pallet is horizontal and the pallet having means at a wider end where the forks of a fork lift can be located under the upper surface of the pallet to permit movement of the pallet.

2. A pallet as claimed in claim 1 wherein the upper surface of the pallet has holes therethrough which holes can receive wicks which can alter the hydraulic conductivity of turf on the pallet to be similar to that of adjacent turf.

3. A turf product, comprising:

a transportable base being an upper surface of a pallet which is adaptable for being handled by a fork lift, said pallet having a tapered base which tapers from a wide end to a narrow end, said pallet further including a foot member removably connectable to said tapered base adjacent the narrow end thereof so that, for growing or maintenance of the turf product, said foot member is connected to said tapered base and the upper surface of said pallet is horizontal and including means at the wide end of said tapered base, whereby forks of a fork lift are locatable under the upper surface of the pallet for permitting movement of said pallet;

a root zone material having embedded therein reinforcement material, said root zone material being located on said transportable base; and, turf growing in said root zone material.

4. A turf product as claimed in claim 3 wherein the pallet is of a plastics material.

5. A turf product as claimed in claim 3 wherein the upper surface of the pallet has holes through which water may pass or to which a wick may be connected.

6. A turf product as claimed in claim 5 including wicks, the length of which are adapted to give an hydraulic conductivity which is similar to that of adjacent turf.

7. A turf product as claimed in claim 6 wherein upper ends of the wicks are unravelled and lie along the upper surface of the pallet or into the root zone material.

8. A turf product being in the form of an extendable slab, the extendable slab comprising:

a growing medium of substantial thickness for providing a root zone, said growing medium having a reinforcing material incorporated therein;

turf established on a surface of said growing medium and having roots extending into the root zone of said growing medium, so that, in combination, the roots of said turf, said reinforcing material and the thickness of said growing medium is such that the extendable slab is consolidated and provided with structural rigidity so that it is capable of being handled; and, a pallet with the extendable slab being positioned upon said pallet, said pallet having an upper surface and a base, said base tapering from a wide end to a narrow end, said pallet further including a foot member removably connectable to said base adjacent the narrow end thereof so that, for growing or maintenance of the turf, said foot member is connected to the pallet and the upper surface of said pallet is horizontal and including means at the wide end of said base, whereby forks of a fork lift are locatable under the upper surface of the pallet for permitting movement of said pallet.

9. The turf product as claimed in claim 8, wherein the upper surface of said pallet includes holes therethrough for receiving wicks capable of altering the hydraulic conductivity of the turf on said pallet so that the hydraulic conductivity of the turf can be similar to that of an adjacent section of turf.

* * * * *